United States Patent
Fukushima et al.

(10) Patent No.: US 8,728,965 B2
(45) Date of Patent: May 20, 2014

(54) METHOD FOR PRODUCING POROUS MATERIAL USING ANTIFREEZE PROTEIN

(75) Inventors: Manabu Fukushima, Nagoya (JP);
Yuichi Yoshizawa, Nagoya (JP);
Norimitsu Murayama, Nagoya (JP);
Sakae Tsuda, Sapporo (JP); Takeshi Koizumi, Chiba (JP); Toshifumi Inoue, Chiba (JP)

(73) Assignee: Nichirei Foods Inc., Tokyo (JP)

( * ) Notice: Subject to any disclaimer, the term of this patent is extended or adjusted under 35 U.S.C. 154(b) by 0 days.

(21) Appl. No.: 13/634,806

(22) PCT Filed: Mar. 16, 2011

(86) PCT No.: PCT/JP2011/056146
§ 371 (c)(1),
(2), (4) Date: Sep. 13, 2012

(87) PCT Pub. No.: WO2011/115145
PCT Pub. Date: Sep. 22, 2011

(65) Prior Publication Data
US 2013/0012678 A1 Jan. 10, 2013

(30) Foreign Application Priority Data
Mar. 16, 2010 (JP) .................. 2010-059807

(51) Int. Cl.
*C08J 9/26* (2006.01)
*B29C 44/02* (2006.01)
*C01F 7/02* (2006.01)

(52) U.S. Cl.
USPC ............... 501/85; 501/80; 530/324; 530/380; 530/370; 530/300; 530/396; 264/44

(58) Field of Classification Search
USPC .......................................................... 521/50
See application file for complete search history.

(56) References Cited

U.S. PATENT DOCUMENTS 7,700,718 B2 * 4/2010 Mie et al. ............... 530/324
2007/0134394 A1 * 6/2007 Jones ..................... 426/565
(Continued)

FOREIGN PATENT DOCUMENTS

DE 10 2008 000 100 A1 7/2009
EP 2 133 317 A1 12/2009
(Continued)

OTHER PUBLICATIONS

Lee, B.; Kang, I.; Cho, S.; Song, H. "Fabrication of a Continuously Oriented Porous Al2O3 Body and Its in Vitro Study" J. Am. Ceram. Soc. 88 (2005) pp. 2262-2266.*

(Continued)

*Primary Examiner* — Randy Gulakowski
*Assistant Examiner* — Christina Wales
(74) *Attorney, Agent, or Firm* — Sughrue Mion, PLLC

(57) ABSTRACT

Provided is a method for producing a porous material, wherein porosity can be controlled to 50% or higher by means of a freezing method, pore size can be controlled to 10 μm to 300 μm, and pore diameter distribution is uniform. The method is a method for producing a porous material, comprising freezing a mixture of water and a raw material comprising at least any of a ceramic material, a resin, a metal, and precursors thereof from a specific portion of the mixture to use ice crystals produced at the time as a pore source and then heat-treating a dry material obtained by removing the ice from the frozen material, wherein the mixture of a raw material and water or the frozen material comprises an antifreeze protein.

4 Claims, 11 Drawing Sheets

(56) References Cited

U.S. PATENT DOCUMENTS

| | | | |
|---|---|---|---|
| 2007/0134647 A1 | 6/2007 | Mie et al. | |
| 2007/0155956 A1* | 7/2007 | Chapman et al. | 530/350 |
| 2010/0099547 A1* | 4/2010 | Fukushima et al. | 501/80 |
| 2011/0056408 A1* | 3/2011 | Schaumburg et al. | 106/18.32 |

FOREIGN PATENT DOCUMENTS

| | | |
|---|---|---|
| JP | 2003-169845 A | 6/2003 |
| JP | 2005-1943 A | 1/2005 |
| JP | 2007-182421 A | 7/2007 |
| JP | 2008-201636 A | 9/2008 |
| JP | 2009-167292 A | 7/2009 |
| JP | 2010-18459 A | 1/2010 |

OTHER PUBLICATIONS

EP Search Report issued Aug. 6, 2013 in corresponding EP Patent Application No. 11756329.6.

Tassilo Moritz et al: "Freeze casting of ceramic components using ice cores and ice moulds", 11th International Ceramics Congress: Proceedings of the 11th International Ceramics Congress, Part of Cimtec 2006—11th International Ceramics Congress and 4th Forum of new Materials, held in Acireale, Sicily, Italy on Jun. 4-9, 2006, Advances in Science and Technology, vol. 45, Jun. 4, 2006, pp. 391-396.

* cited by examiner (A)

(B)

(C)

(D)

(E)

(A)

(B)

(A)

(B)

(A)

(B)

(A)

(B)

(A)

(B)

(A)

(B)

(C)

(A)

(B)

(C)

(A)

(B)

(C)

(A)

(B)

(A)

(B)

METHOD FOR PRODUCING POROUS MATERIAL USING ANTIFREEZE PROTEIN

CROSS REFERENCE TO RELATED APPLICATIONS

This application is a National Stage of International Application No. PCT/JP2011/056146, filed on Mar. 16, 2011, which claims priority from Japanese Patent Application No. 2010-059807, filed on Mar. 16, 2010, the contents of all of which are incorporated herein by reference in their entirety.

TECHNICAL FIELD

The present invention relates to a method for producing a porous material, which involves containing an antifreeze protein in a mixture of a raw material and water as a component which makes a pore size distribution uniform in a freezing method used in producing an industrial material such as a ceramic material, a metal, or a resin, having a porous structure.

BACKGROUND ART

A porous material, which is a structure containing pores, is widely used as an industrial material utilizing its porous structure, such as a filter, a fluid permeable member, a catalyst carrier, an adsorbing material, or an insulating material. Especially, a porous material having unidirectional through-pores is widely used as a filter, a fluid permeable member, or the like. In the development of such applications, the permeation of a large volume of fluid, the increase of trapping efficiency, or the upsizing of the member represents a challenge.

As a method for producing a porous material having unidirectional through-pores, there is proposed a method using the phase separation of a raw material, particularly involving freezing water contained in the raw material followed by removing ice by drying, that is, a method using the ice as a pore source. This method is, for example, a method which involves mixing water and a particulate material as a raw material to make a slurry, pouring the slurry into a die, freezing the slurry from the bottom of the die to grow ice, and removing the ice from portions where the ice is formed by drying to provide pores.

Examples of the method include the following propositions which have previously been made.

For example, a method for producing a ceramic molded product having macropores has been proposed, which involves preparing a slurry in which a ceramic powder as a raw material is dispersed in water, freezing the resultant slurry from a specific direction to promote the growth of ice, and subjecting the frozen slurry to vacuum-freeze drying to sublime the ice to provide the ceramic molded product having macropores (Patent Literature 1).

Meanwhile, a method for producing a resin porous material has been proposed, which involves forming a three-dimensional network structure between a polymer of a water-soluble organic monomer and a water-swellable clay mineral exfoliated in layers and removing the contained solvent by freeze-drying to provide the resin porous material (Patent Literature 2).

A method for producing a porous biomaterial has also been proposed, which involves mixing hydroxyapatite/collagen composite fiber and buffer solution, growing ice crystals by freezing treatment, and then providing unidirectional pores by drying (Patent Literature 3).

In addition, mention is made of a method for producing a porous ceramic material having unidirectional pores, which involves freezing an aqueous solution of a ceramic precursor, freeze-growing water of the resultant unidirectionally in the form of a column, and then dry-removing the ice (Patent Literature 4).

The present inventors have also proposed a new method for molding a ceramic porous material, in which gelation and freezing are combined (Patent Literature 5).

According to the method, a step of gelation is added to improve moldability as compared to existing techniques and to suppress the growth of dendritic ice crystals. The gelling agent retains water, enabling the provision of an extremely high porosity.

In the above freezing methods, that is, the methods which each involve freezing a mixture of a raw material and water from a specific portion thereof, one portion contacting a refrigerant has a low temperature and another portion at a greater distance from the refrigerant has a higher temperature; thus, the frozen material has a non-uniform temperature distribution. Generally, ice crystals are finer when formed at a lower temperature and coarse ice crystals are formed at high temperature (Non Patent Literature 1).

Thus, a problem was that ice in a portion contacting a refrigerant has a fine size whereas ice at a greater distance from the refrigerant forms coarse ice crystals. In addition, there was a problem that a greater distance from a refrigerant increases the ice formation temperature since latent heat with freezing is released in the formation of ice.

Another conventional problem was that it is difficult to suppress re-crystallization of ice occurring within a frozen material during the formation of a porous material. The re-crystallization of ice means re-crystallization after the dissolution of the whole or part of ice crystals. More simply, it means the sticking of ices to each other. For example, the freezing of an aqueous material having a particularly high water content such as a gel or an ice cream easily leads the re-crystallization of ice in the resultant. When unidirectional freezing is slowly performed, a bundle of ices is easily formed since there is sufficient time for the re-crystallization of ice to occur. The re-crystallization of ice cannot easily be suppressed even by close attention to the composition of an aqueous material, the freezing temperature, and the like, which has been responsible for the hindrance of the execution of the technique.

As described above, the freezing method is an excellent method in that it can provide unidirectionally oriented pores, but has had a problem that it causes the size or thickness of an ice formed in a raw material or a gel to be non-uniform.

CITATION LIST

Patent Literature

Patent Literature 1: JP Patent Publication (Kokai) No. 2001-192280 A
Patent Literature 2: JP Patent Publication (Kokai) No. 2004-359747 A
Patent Literature 3: JP Patent Publication (Kokai) No. 2007-98117 A
Patent Literature 4: JP Patent Publication (Kokai) No. 2009-46341 A
Patent Literature 5: JP Patent Publication (Kokai) No. 2008-201636 A Non Patent Literature Non Patent Literature 1: Hideo Tsuyuki, Syokuhin Kakogaku (Food Processing) 2nd Ed., "Kako Kara Hozo Made (From Processing to Preservation)", 14-16, Kyoritsu Shuppan Co., Ltd., Tokyo.
Non Patent Literature 2: "Comparison of functional properties of two fungal antifreeze proteins from Antarctomyces psychrotrophicus and Typhula ishikariensis" Nan Xiao, Keita Suzuki, Yoshiyuki Nishimiya, Hidemasa Kondo, Ai Miura, Sakae Tsuda, and Tamotsu Hoshino. (2010) FEBS Journal, 277, 394-403.
Non Patent Literature 3: "Antifreeze proteins: an unusual receptor-ligand interaction. Zongchao Zia and Peter Davies" (2002) TRENDS in Biochemical Sciences, 27 (2), 101-106.

SUMMARY OF INVENTION

Technical Problem

According to the above methods for providing pores by the phase separation of ice using freezing phenomenon, one portion adjacent to a refrigerant for freezing has a low temperature and forms fine ice crystals whereas another portion at a greater distance from the refrigerant has a higher temperature and thus forms coarse ice crystals. Thus, it has been difficult to make the size of the ice crystals uniform throughout the member.

A technique has also been needed for suppressing re-crystallization of ice occurring in a frozen slurry or a frozen gel. It has been an unsolved problem that the ice in the gel is re-crystallized to generate ice pillars having various thicknesses.

From the situation of the above conventional techniques, there has been a need for the development of a new method capable of producing a high-porosity porous material having an even pore diameter distribution in the sample without requiring any complex operation.

Accordingly, an object of the present invention is to provide a method for producing a porous material, in which porosity can be controlled to 50% or higher by means of a freezing method, pore size can be controlled to 10 µm to 300 µm, and pore diameter distribution is uniform.

Solution to Problem

As a result of intensive studies for solving the above-described problems, the present inventors have found that an antifreeze protein is added to a mixture of a raw material and water, which is then frozen to elongate ice pillars serving as a pore source while maintaining thinness. In addition, it has been found that the mixture thus frozen can be dried to remove the ice crystals to produce a porous molded product in which the pore size is made uniform, and the present invention has been accomplished based on this finding.

Thus, the method for producing a porous material according to the present invention has the following features.

A first aspect of the present invention is a method for producing a porous material, comprising freezing a mixture of water and a raw material comprising at least any of a ceramic material, a resin, a metal, and precursors thereof from a specific portion of the mixture to use ice crystals produced at the time as a pore source and then heat-treating a dry material obtained by removing the ice from the frozen material, wherein the mixture of a raw material and water or the frozen material comprises an antifreeze protein.

A second aspect of the present invention is the method for producing a porous material according to the above first aspect, wherein the antifreeze protein is a substance having a function inhibiting crystal growth and re-crystallization of the ice.

A third aspect of the present invention is the method for producing a porous material according to the above first aspect, wherein the mixture of a raw material and water comprises a gelable water-soluble polymer which is an irreversible gelation polymer capable of being gelated and not returning to the tissue before freezing during drying.

A fourth aspect of the present invention is the method for producing a porous material according to the above third aspect, wherein the gelable water-soluble polymer is at least any of an acrylamide polymer, an alginic acid polymer, a polyethylenimine polymer, a methylcellulose polymer, a polysaccharide gel, a protein gel, gelatin, and agar.

A fifth aspect of the present invention is the method for producing a porous material according to the above first aspect, wherein the raw material is at least any of silicon carbide, silicon nitride, alumina, zirconia, hydroxyapatite, phenol, acrylic, polystyrene, nylon, polyethylene, polypropylene, polyvinyl chloride, Teflon (registered trade mark), iron, and aluminum.

A sixth aspect of the present invention is a porous material produced by the method for producing a porous material according to any of the above first to fifth aspects.

Effects of Invention

According to the above first aspect, in the producing method using ice crystals as a pore source which are formed in the course of freezing a mixture of water and a raw material comprising a ceramic material, a resin, or a metal from a specific portion thereof, the mixture of the raw material and water or the frozen material can comprise an antifreeze protein to reduce the unevenness of the ice size.

According to the above second to fifth aspects, the growth in the direction of the axis a and re-crystallization of the ice can be strongly suppressed to produce a porous material having pores with a uniform size and excellent in communicating property.

According to the sixth aspect, a porous material having a porosity of 50% to 99% and a pore size of 10 µm to 300 µm can be made by the producing method of the above first to fifth aspects.

The present specification encompasses the contents of the specification and/or drawings of Japanese Patent Application No. 2010-059807 on which the priority of the present application is based.

BRIEF DESCRIPTION OF DRAWINGS

FIG. 1 (B) is a schematic diagram showing when the single crystal of ice is changed into a hexagonal dipyramid-shaped one due to the adsorption of AFP. FIG. 1 (C) is a schematic diagram of a hexagonal dipyramid-shaped ice crystal to the surface of which AFP is adsorbed. FIG. 1 (D) is a schematic diagram showing how needle-like ices are elongated from the tip sections of the hexagonal dipyramid-shaped ice crystal. FIG. 1 (E) is a schematic diagram of a porous material produced by using (D) as a pore source.

FIG. 2 (A) and FIG. 2 (B) show microstructures of portions near a refrigerant and 0.9 mm distant from the refrigerant, respectively.

FIG. 3 (A) is that of a porous alumina produced by applying a freezing temperature of −20° C. and FIG. 3 (B) is that of a porous alumina produced by applying a freezing temperature of −40° C. The sample height is 1 cm. The microstructure of each central portion obtained by grinding 4 mm each of the upper and lower parts is shown.

FIG. 4 (A) and FIG. 4 (B) show microstructures of portions near a refrigerant and 0.9 mm distant from the refrigerant, respectively.

FIG. 5 (B) is a micrograph of a hexagonal dipyramid-shaped ice crystal observed in a purified antifreeze protein sample.

FIG. 6 (A) is that of a porous alumina produced by applying a freezing temperature of −20° C., and FIG. 6 (B) is that of a porous alumina produced by applying a freezing temperature of −40° C. The sample height is 1 cm. The microstructure of each central portion obtained by grinding 4 mm each of the upper and lower parts is shown.

FIGS. 7 (A), (B), and (C) show microstructures of portions near a refrigerant, 0.5 cm distant from the refrigerant, and 0.9 mm distant from the refrigerant, respectively.

FIGS. 8 (A), (B), and (C) show microstructures of portions near a refrigerant, 0.5 cm distant from the refrigerant, and 0.9 mm distant from the refrigerant, respectively.

FIGS. 9 (A), (B), and (C) show microstructures of portions near a refrigerant, 0.5 cm distant from the refrigerant, and 0.9 mm distant from the refrigerant, respectively.

FIGS. 10 (A) and (B) show microstructures of portions near a refrigerant and 0.9 mm distant from the refrigerant, respectively.

FIGS. 11 (A) and (B) show microstructures of portions near a refrigerant and 0.9 mm distant from the refrigerant, respectively.

DESCRIPTION OF EMBODIMENTS

Figure 1:
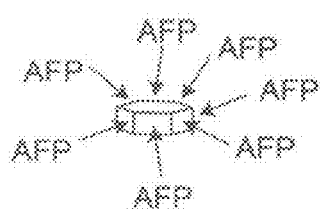
FIG. 1 (A) is a schematic diagram showing a single crystal of ice and showing a state in which AFP (antifreeze protein) is strongly adsorbed to the surface of the crystal.
Figure 1:
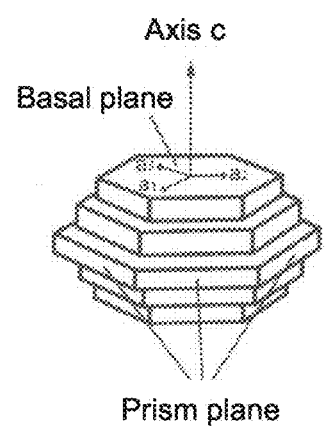
Figure 1:
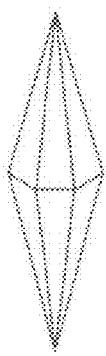
Figure 1:
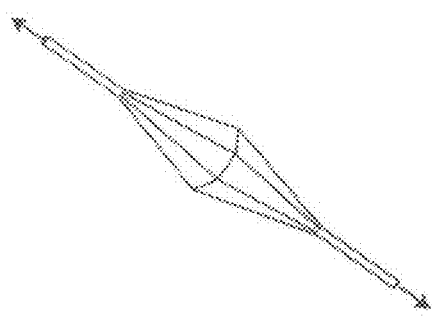
Figure 1:
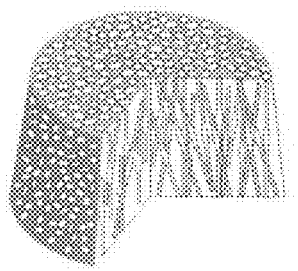

Embodiments of the present invention will be described below. Of course, the following description is for the purpose of enabling the spirit of the invention to be better understood, and is not intended to limit the present invention.

The method for producing a porous material according to the present invention involves freezing a mixture of a raw material and water to use ice crystals produced at the time as a pore source and then removing the ice from the frozen material.

The raw material used in the present invention contains at least any of a ceramic material, a resin, a metal, and precursors thereof.

When a ceramic material is used, any ceramic material may be used without limitation provided that it is a commonly known ceramic particulate material; examples thereof can include alumina, zirconia, apatite, silicon carbide, silicon nitride, boron nitride, and graphite ceramics. A silica, alumina, zirconia, titania, or polysilane alkoxide or inorganic polymer may also be used as a commonly known ceramic precursor.

A phenol, acrylic, polystyrene, nylon, polyethylene, polypropylene, vinyl chloride, polycarbonate, polyimide, or Teflon (registered trade mark) resin may be used.

Any metal may be used without limitation provided that it is a commonly known metal powder; examples thereof can include iron, alumina, and other metal powders. The above raw materials may be used alone or in a combination of two or more thereof.

The average particle diameter of the raw material is in the range of 300 μm or less, preferably 0.1 μm to 300 μm, particularly preferably 1 μm to 100 μm.

An average particle diameter of raw material particles of more than 300 μm is not preferable because the particles are less dispersible in water and have the possibility of precipitation. When small particles are used, a dispersant may also be added to enhance the crushing and dispersibility of aggregated particles.

For example, when a ceramic particulate material is used as a raw material, it preferably has a particle diameter of 1 μm or less, more preferably 0.8 μm or less, still more preferably 0.6 μm or less for uniform dispersion. Particularly, particles of 0.1 μm or less are contained in an appropriate amount to promote sintering to increase the strength of the ceramic sintered-body.

The present invention is characterized in that a porous material having a high porosity and a uniform pore diameter distribution is produced without depending on the type of a starting raw material. Thus, the shape of a raw material is not particularly limited, and may be selected considering an environment in which it is used.

Any components other than the above, for example, a small amount of a sintering aid and the like, may be selectively added as needed to the raw material of the present invention provided that they do not the impair advantages of the present invention.

The antifreeze protein used in the present invention will now be described in detail.

The antifreeze protein used in the present invention refers to a protein having a function suppressing the growth of an ice crystal by adsorption to the surface of the ice crystal and a function suppressing re-crystallization.

These two functions can be easily identified by use of a light microscope in which the sample temperature can be set to a minus temperature region (see Non Patent Literature 2). Thus, it can be easily determined by microscopic observation or the like whether a substance of interest is an antifreeze protein or not; it has previously been shown that a fish, a plant, an insect, a bacteria, and the like have antifreeze proteins.

Generally, the antifreeze protein may be called under various names such as a thermal hysteresis protein and an anti-freezing protein. It is sometimes denoted, for example, as an anti-freezing protein, an ice crystal-binding protein, or a re-crystallization-inhibiting protein. In addition, there are a plurality of given names such as an antifreeze protein (AFP), an ice binding protein (IBP), and an ice structuring protein (ISP). For the purpose of the present invention, the antifreeze protein encompasses all proteins having these names.

A small protein having 20 to 30 amino acid residues is sometimes called a peptide; the antifreeze protein of the present invention encompasses a peptide having a function suppressing the crystal growth and re-crystallization of an ice by adsorption to the surface of the ice crystal, that extracted and purified from a natural source such as a fish, a plant, an insect, a bacteria, or the like, that produced using bacterial culture and a transgenic DNA technology, and that produced by a chemical synthesis.

The antifreeze protein has various variations in the amino acid composition and higher-order structure thereof. For example, fish-derived antifreeze proteins include AFP I of a molecular weight of about 3,000 to 5,000, formed of an α-helical structure and rich in Ala, AFP II of a molecular weight of about 14,000 to 24,000 and formed of a C-type lectin-like structural motif, AFP III of a molecular weight of about 7,000 and formed of a globular structure containing a plurality of β-structures, AFP IV of a molecular weight of about 12,000 and formed of a structure in which α-helixes are bundled, and AFGP of a molecular weight of about 3,000 to 24,000, composed of a repeated structure of 3 residues (-Ala-Thr-Ala-) in which a side chain of the Thr residue is modified with a sugar chain (see Non Patent Literature 3).

The antifreeze protein according to the present invention encompasses AFP I to III and AFGP. There are also an insect-derived antifreeze protein of a molecular weight of about 7,000 to 12,000 and formed of a n-helix structure, and a newly discovered plant- and bacteria-derived antifreeze protein whose compositional analysis and structural analysis are underway. Even antifreeze proteins classified into a same type are known to be different in the partial amino acid composition, the partial sequence, the local structure and the like depending on the organism species from which they are derived.

For example, the fishes sea raven and poacher have AFP II; however, their AFP II have an amino acid sequence homology of about 60%. The antifreeze protein according to the present invention encompasses all of these molecules.

For the antifreeze protein used in the present invention, any of the above various proteins can be used; they can be selectively used considering a shape, size and the like of ice without being limited by a type or shape of the antifreeze protein provided that they are used for the purpose of the growth suppression, the suppression of re-crystallization of ice crystals, the uniformization of the ice size, the uniform dispersion of a solute, or the freezing-point depression as a function of the antifreeze protein as set forth in detail hereinafter.

The function of the antifreeze protein according to the present invention will now be described in detail.

When water is cooled to 0° C. or lower, an ice crystal to serve as a nucleus soon occurs spontaneously. The structure of the ice crystal is flat hexagonal plate-like as illustrated in FIG. 1 (A). The 6 equivalent ice crystal planes (the planes vertical to the axes a1 to a3 in FIG. 1 (B)) are called prism planes, and the 2 equivalent ice crystal planes (the planes vertical to the axis c) are called basal planes. Both the prism plane and the basal plane have a property of adsorbing surrounding cold water molecules for crystal growth.

The prism plane more efficiently adsorbs water molecules; thus, when an antifreeze protein is absent, the growth rate of the ice crystal in the direction of the axes a1 to a3 (hereinafter collectively abbreviated as the axis a) is about 100 times higher than the growth rate of the ice crystal in the direction of the axis c. The antifreeze protein strongly binds to a certain set of water molecules forming the surface of the growing ice crystal (FIG. 1 (A), AFP in the figure represents an antifreeze protein).

To which set the antifreeze protein binds may vary depending on the type thereof; however, in most cases the antifreeze protein results in the accumulation of the antifreeze protein on the prism plane or crystal growth planes including the prism plane, which leads to the termination of the growth of the ice crystal in the direction of the axis a.

As a result, the growth of the ice crystal occurs in the direction of the axis c, in which new plate-like ice crystals are piled up on the basal plane. However, since the growth of piled-up plate-like ice crystals in the direction of the axis a is terminated by the accumulation of the antifreeze protein, plate-like ice crystals of slightly smaller sizes are newly piled up (FIG. 1(B)).

In this way, a unique shaped ice crystal in which two six-sided pyramids are bonded together on their bottom planes as shown in FIG. 1(C), crystallographically called a hexagonal bipyramidal crystal is observed for almost all types of antifreeze proteins found to date.

The hexagonal bipyramidal ice crystal as shown in FIG. 1(C) can be inferred to have two features as described below.

The first feature is that antifreeze proteins accumulate on the surface of a hexagonal bipyramidal ice crystal. Thus, the hexagonal bipyramidal ice crystals probably have the property of less easily binding to each other, that is, the property of being less easily re-crystallized.

The second feature is that when a hexagonal bipyramidal ice crystal is generated by cooling, followed by continuing cooling to a lower temperature, sharp needle-like ice crystals soon fall out of two tip sections of the ice crystal (see FIG. 1(D)). The tip section of the hexagonal bipyramidal ice crystal is the basal plane whose region has been extremely narrowed by the inhibition of growth in the direction of the axis a caused by an antifreeze protein; only the section is probably forced to undergo the crystal growth by the cooling, resulting in the occurrence of the growth of the needle-like ice crystal.

By making use of the above two features of the hexagonal bipyramidal ice crystal, a porous molded product having a uniform pore diameter as shown in FIG. 1 (E) can be produced.

The use of an antifreeze protein in the present invention is intended to take advantage of the function of the antifreeze protein described above in detail, that is, to extend needle-like ice crystals at a constant thinness to enable orientation to be provided to ice crystals during freezing in a water-soluble polymer gel containing a raw material, water, and an antifreeze protein, resulting in making the pore size distribution uniform.

According to the present invention, a gel material can also be made by adding a gelling agent to a mixture of a raw material, water, and an antifreeze protein, followed by applying a gelation-freezing method thereto to produce a porous material.

The gelling agent used here is preferably a gelable water-soluble polymer, wherein the polymer is an irreversible gelation polymer not returning to a tissue structure before freezing once it is frozen.

Examples of the gelling agent can include acrylamide polymers such as an N-alkylacrylamide polymer, an isopropylacrylamide polymer, a sulfomethylated acrylamide polymer, an N-dimethylaminopropyl methacrylamide polymer, and a polyalkylacrylamide polymer, an alginic acid polymer, a polyethylenimine polymer, starch, carboxymethylcellulose, hydroxymethylcellulose, sodium polyacrylate, polyvinyl alcohol, polyethylene glycol, polyethylene oxide, a polysaccharide gel, a protein gel, gelatin, and agar. Among these gelling agents, preferred is that gelating at around ambient temperature or in the air. The type and the amount of the gelling agent to be added may be appropriately selected depending on the dispersibility of the particulate material in water and the like.

The method for producing a porous material according to the present invention will be described below in detail.

A slurry is first prepared by mixing a raw material, water, and an antifreeze protein.

To make the final porosity of the resulting porous material 50% by volume or more, it is preferable to set the raw material content at 50% by volume or less, the water content at 49.9% by volume or less, and the antifreeze protein content at 0.01 to 10% by volume. The antifreeze protein content is particularly desirably 0.1 to 5% by volume, and even the small amount of the order of 0.1 to 5% by volume thereof is effective in the suppression of the growth of the ice crystal, the re-crystallization of ice crystals, the size uniformization, the uniform dispersion of a solute, and the freezing-point depression. The raw material content is particularly preferably 30 to 40% by volume, and the content range makes the porosity of the porous material 60 to 70% by volume and enables the compatibility between strength and porosity as a porous material.

When a gelling agent is added to make a gel material, the content of the raw material can be set at 1 to 28% by volume since higher porosity can be reached. In this case, it is preferable to set the content of water at 72 to 97.9% by volume, the content of the gelling agent at 1 to 10% by volume, and the content of the antifreeze protein at 0.1 to 5% by volume.

To make a gel material, a raw material, water, and an antifreeze protein are first mixed to make a slurry, to which a gelling agent is then added to prepare a slurry of the above percent by volume.

Then, the slurry is cast into a molding die and solidified and gelated in a state of retaining water in the gel. The gelation fixes the raw material in the gel. The gelled molded product is preferably made into a shape of a porous material representing a final product since subsequent steps can be simplified. Alternatively, a method may also be adopted which involves once casting a slurry having a gelling agent added into a die having an appropriate sized shape for gelation to provide a gel material and forming a gelled molded product, for example, by pressing a molding die against the gel material.

An antifreeze protein may also be contained in a gel material after obtaining the gel material rather than adding it in making the gel material. It may also be contained in the resultant gel material by immersing the gel material in an aqueous solution of an antifreeze protein. For the concentration and the immersion time in an aqueous solution of the antifreeze protein, for example, the concentration may be 0.01 to 30% by weight and the immersion time may be 15 minutes to 100 hours.

In cases where it is desired to strongly promote the suppression of the growth of the ice crystal, the suppression of the coalesce of ice crystals, the size uniformization, the uniform dispersion of a solute, and the freezing-point depression, the antifreeze protein may be sufficiently impregnated to a gel material by immersing the gel material in an aqueous solution of an antifreeze protein at a concentration of 20% by weight for 72 hours.

Then, the slurry or gel material casted into a die is frozen.

It is desirable to use a slurry-freezing method when a porous material having a porosity of the order of 70% or less is molded and to use a gelation-freezing method when a higher porosity material is molded.

For the slurry-freezing method, when the porosity is tried to be increased to 70% or more, a problem is sometimes posed, for example, that the molded product is disrupted during vacuum drying to unable the retention of its shape, or the handling is difficult. When a material having a high porosity of 70% or more is molded using the gelation-freezing method, a mixture of a raw material and water is gelated and the gel material is frozen.

According to the freezing method of the present invention, the slurry or the gel material is frozen from a specific portion thereof. Specifically, cooling can be made from the slurry or the gel material at a portion of a die, for example, at the bottom thereof to provide a frozen material in which ice is unidirectionally oriented in the slurry or the gel material (see FIG. 1(E)). The cooling may be done by using a known method such as a conventional freezer, a quick freezer, or a supercooling freezer, and is performed from the outside of the die for either method.

The freezing temperature for making the frozen material is not particularly limited provided that it is a temperature at which water is frozen; however, since the temperature range for ice generation is −1 to −10° C., it is preferably set at −10° C. or lower to avoid the undue growth of ice midway through cooling by setting the freezing temperature to lower than the temperature range for ice generation.

Then, the frozen material is subjected to the removal of ice, dried, and heat-treated or calcined.

By removing ice crystals formed in a frozen molded product, the removed portions form pores; thus, it is important to remove only ice while reducing the breakage of the skeletal structure of a raw material powder in a frozen state. In other words, a method for removing ice is desirable which causes little dimensional change of the structure and has little risk of destroying a sample.

A freeze dry method can be used as a drying method having little risk of the dimensional change and the sample destruction. Specifically, it is a method which involves directly sublimating ice in a frozen material under vacuum or reduced pressure to remove only ice. This method causes no movement of water accompanied by the melting of ice and leads to the evaporation of ice from the molded product surface; thus, it is preferable because of little causing the dimensional change.

The heating temperature and the heating time can typically be set for the heat treatment after drying depending on the type and the like of a raw material for the purpose of securing the strength of the resultant porous material. For example, for silicon carbide and silicon nitride, calcining at 1,500 to 2,200° C. for about 2 hours is desirable. Calcining at 1,100 to 1,600° C. for about 2 hours for alumina, at 1,200 to 1,600° C. for about 2 hours for zirconia, and at 900 to 1,200° C. for about 2 hours for hydroxyapatite are desirable.

When the acrylic resin powder is used, heat treatment at about 200° C. for about 30 minutes is desirable. For polyethylene and polypropylene, about 100 to 130° C. for about 30 minutes is desirable. For nylon 6 and nylon 66, about 180 to 200° C. for about 30 minutes is desirable, and for polystyrene, about 150 to 190° C. for about 30 minutes is desirable.

Calcining at 800 to 1,300° C. for about 2 hours for iron and at 400 to 600 for about 2 hours for aluminum are desirable. If the heat treatment is not performed at a temperature of 50% to 90% (inclusive) of each melting point such as each of the heat-treatment temperatures described, a porous material having strength cannot be obtained. For the heat treatment, the temperature and the time should be properly adjusted depending on the raw material powder used, the particle diameter thereof, and the desired porosity.

According to the porous material producing method of the present invention by the freezing method, an antifreeze protein can be contained in a slurry or gel material composed of a raw material and water to achieve the suppression of ice crystal growth during freezing, the suppression of the coalesce of ice crystals, and the size uniformization to produce a porous material high in the porosity of the finally obtained porous material and having a uniform pore size.

EXAMPLES

The present invention will now be specifically described with reference to Examples. The present invention is largely characterized in that a porous material having a high porosity and a uniform pore size can be produced without depending on the type of a raw material. Thus, it is not limited by the following Examples and useful for various raw materials.

<Preparation of Antifreeze Protein>

An antifreeze protein was prepared by the following procedure. The preparation method was performed according to a method for preparing "fish-derived antifreeze protein" described in JP Patent Nos. 4228066 and 4332646.

A right-eyed flounder was used as a collection source for the antifreeze protein. To 300 g of a fish meat thereof was added an equal amount (v/w) of water, which was then stirred using a juicer/blender to prepare a fish-meat paste suspension.

This suspension was centrifuged at 6,000 revolutions per minute for 30 minutes to provide a supernatant containing the antifreeze protein. This supernatant was heat-treated at 70° C. for 10 minutes to heat-denature contaminating proteins other than the antifreeze protein for precipitation. Then, the resultant was centrifuged at 6,000 revolutions per minute for 30 minutes to remove the precipitated contaminating proteins.

Figure 5:
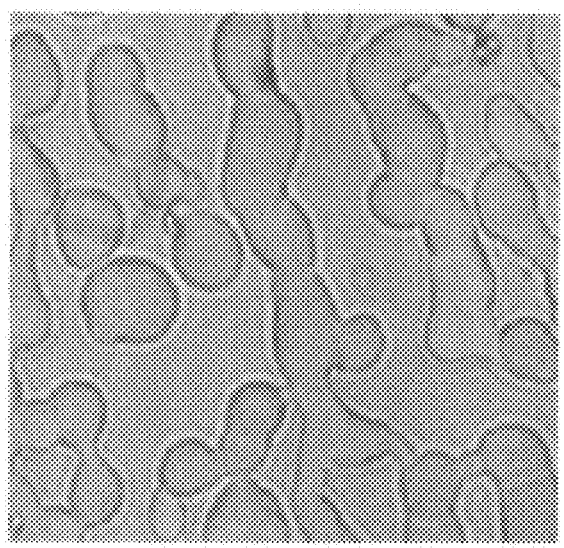
FIG. 5 (A) is a micrograph of ice crystals observed in an aqueous solution of a fish meat-contaminated protein.
Figure 5:
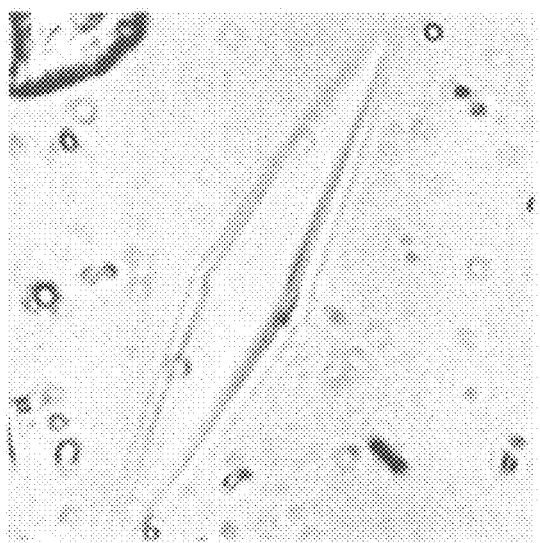

A sample obtained by dissolving the contaminating proteins in water was subjected to the observation of the shape of ice crystals using DMLB microscope from Leica, and as a result, it was confirmed that no hexagonal dipyramid-shaped ice crystal was observed, that is, no antifreeze protein activity was present, for the contaminating proteins as shown in FIG. 5 (A).

The supernatant obtained by this operation was freeze-dried to provide about 1 gram of a sample powder. Hexagonal dipyramid-shaped ice crystals were observed in this sample as shown in FIG. 5(B), which confirmed that the sample powder was an antifreeze protein.

The antifreeze protein powder sample obtained by the above procedure was used in the following Examples.

Example 1

A slurry was made by mixing 10% by volume of α-alumina powder (TM-DAR from Taimei Chemicals Co., Ltd., average particle diameter: 0.2 μm), 86.75% by volume of distilled water, and 0.25% by volume of the antifreeze protein, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and gelated in a refrigerator. After gelation, the die was cooled together with its content at −20° C. or −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 6:
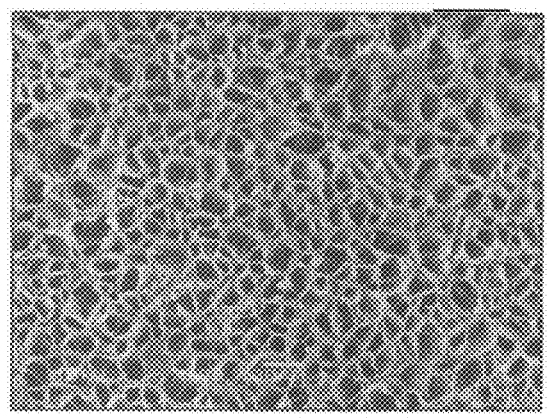
FIG. 6 is a pair of SEM photographs of a porous alumina in the direction vertical to the direction of freezing, which was produced by a gelation-freezing method after adding an antifreeze protein to 0.25% by volume to a raw material, water, and a gelling agent.
Figure 6:
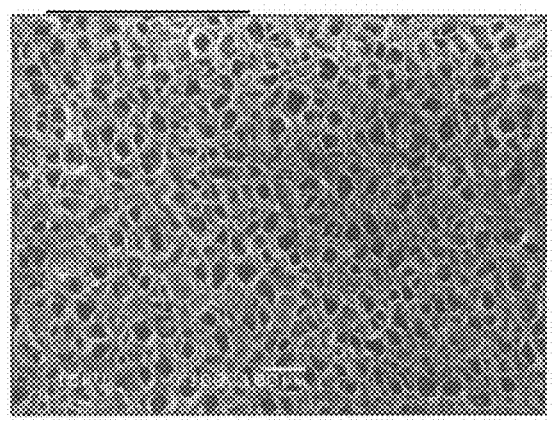

SEM photographs (cross-section structures in the direction vertical to the direction of freezing) of the porous materials made in this Example are shown in 6 (A) (−20° C.) and FIG. 6 (B) (−40° C.). These were each obtained through observing the central portion obtained by grinding 4 mm each of the upper and lower parts of the sample having a height of 1 cm.

Example 2

A slurry was made by mixing 10% by volume of α-alumina powder (TM-DAR from Taimei Chemicals Co., Ltd., average particle diameter: 0.2 μm), 86.5% by volume of distilled water, and 0.5% by volume of the antifreeze protein, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 7:
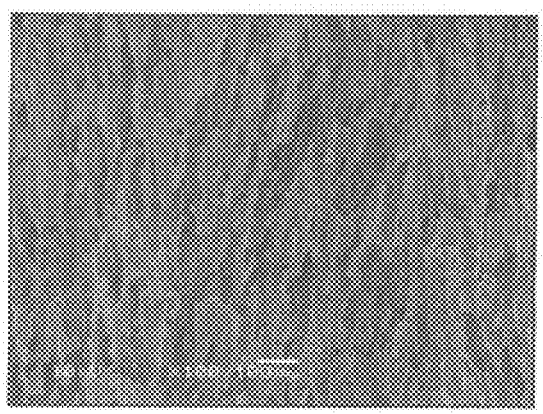
FIG. 7 is a series of SEM photographs of a porous alumina in the direction parallel to the direction of freezing, which was produced by applying a freezing temperature of −40° C. by a gelation-freezing method after adding 0.5% by volume of an antifreeze protein to a raw material, water, and a gelling agent.
Figure 7:
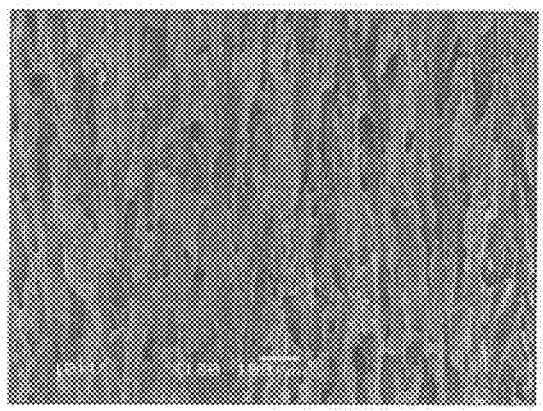
Figure 7:
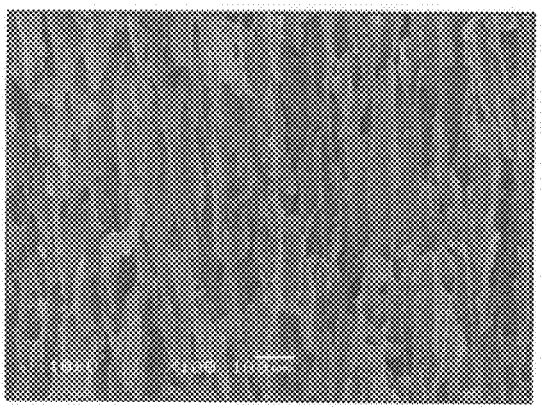

SEM photographs of the porous material made in this Example are shown in FIG. 7. FIG. 7 (A), FIG. 7 (B), and FIG. 7 (C) show microstructures of portions near a refrigerant, 0.5 mm distant from the refrigerant, and 0.9 mm distant from the refrigerant, respectively.

Example 3

A slurry was made by mixing 10% by volume of α-alumina powder (TM-DAR from Taimei Chemicals Co., Ltd., average particle diameter: 0.2 μm), 84% by volume of distilled water, and 3% by volume of the antifreeze protein, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.). The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 8:
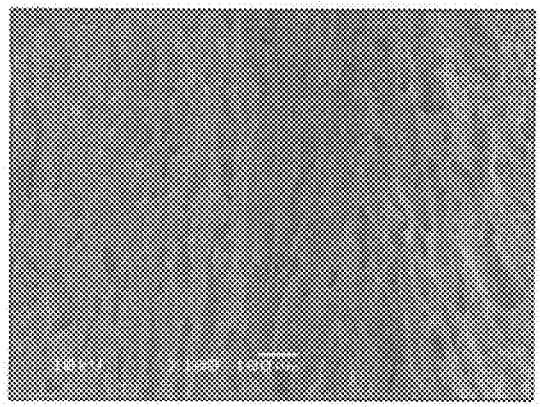
FIG. 8 is a series of SEM photographs of a porous alumina in the direction parallel to the direction of freezing, which was produced by applying a freezing temperature of −40° C. by a gelation-freezing method after adding 3.0% by volume of an antifreeze protein to a raw material, water, and a gelling agent.
Figure 8:
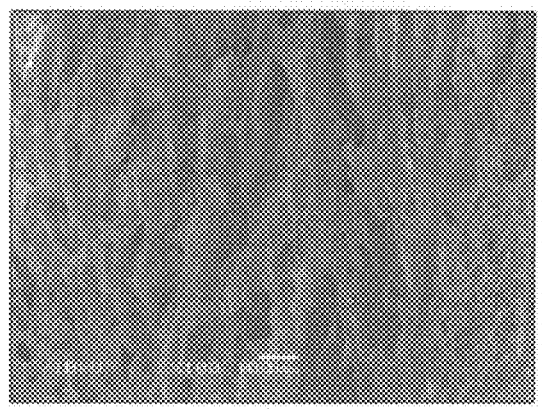
Figure 8:
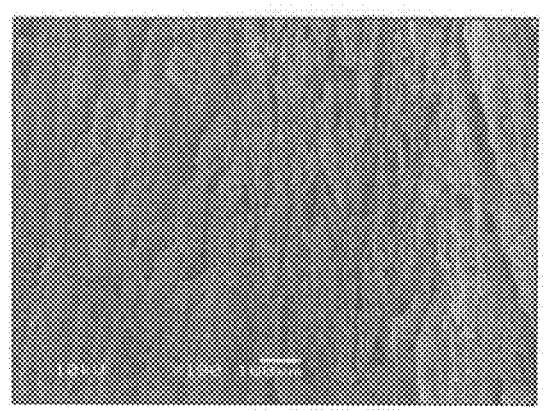

SEM photographs of the porous material made in this Example are shown in FIG. 8. FIG. 8 (A), FIG. 8 (B), and FIG. 8 (C) show microstructures of portions near a refrigerant, 0.5 mm distant from the refrigerant, and 0.9 mm distant from the refrigerant, respectively.

Example 4

A slurry was prepared by mixing 30% by volume of α-alumina powder (TM-DAR from Taimei Chemicals Co., Ltd., average particle diameter: 0.2 μm), 66.75% by volume of distilled water, 3% by volume of a binder (AP2 from Yuken Industry Co., Ltd.) and 0.25% by volume of the antifreeze protein.

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 9:
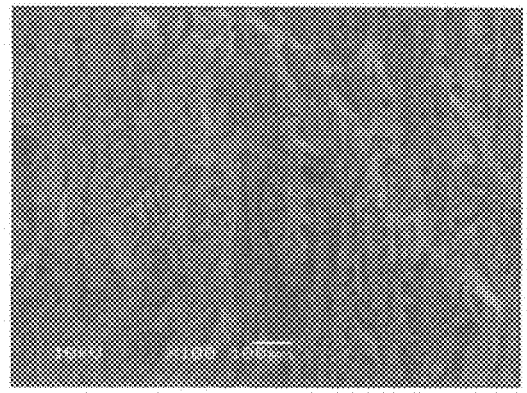
FIG. 9 is a series of SEM photographs of a porous alumina in the direction parallel to the direction of freezing, which was produced by applying a freezing temperature of −40° C. by a slurry-freezing method after adding 0.25% by volume of an antifreeze protein to a raw material and water.
Figure 9:
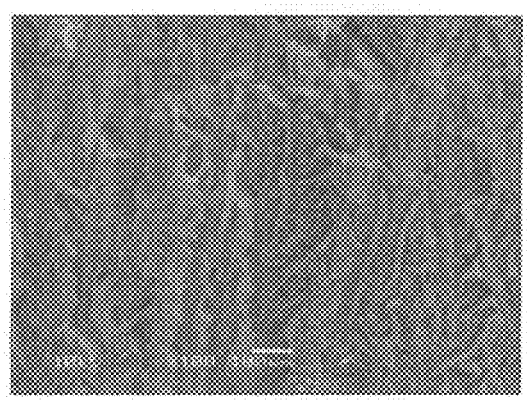
Figure 9:
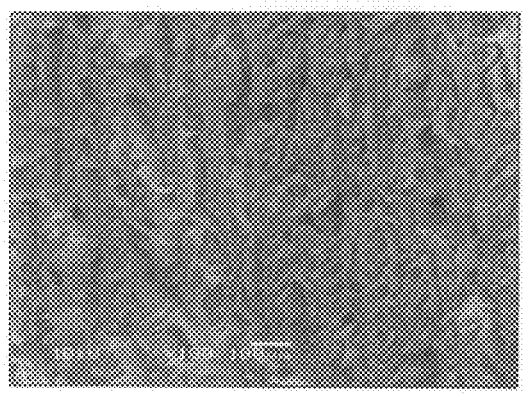

SEM photographs of the cross-section structure of the porous material made in this Example, in the direction parallel to the direction of freezing are shown in FIG. 9. FIG. 9 (A), FIG. 9 (B), and FIG. 9 (C) show microstructures of portions near a refrigerant, 0.5 mm distant from the refrigerant, and 0.9 mm distant from the refrigerant, respectively.

Example 5

A slurry was made by mixing 10% by volume of 3Y zirconia powder (TZ-3YE from Tosoh Corporation, specific surface area: 16 m²/g), 86.75% by volume of distilled water, and 0.25% by volume of the antifreeze protein, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,500° C. for 2 hours in a calcining furnace.

Figure 10:
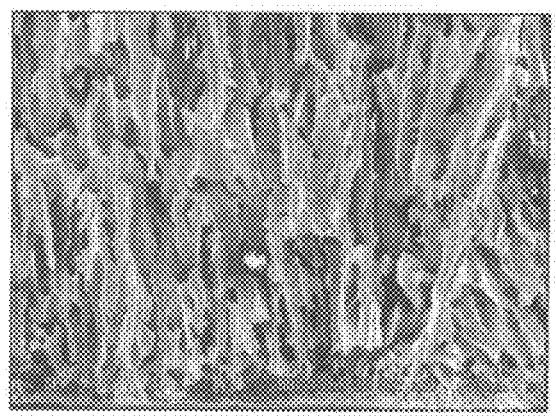
FIG. 10 is a pair of SEM photographs of a porous zirconia in the direction parallel to the direction of freezing, which was produced by applying a freezing temperature of −40° C. by a gelation-freezing method after adding 0.25% by volume of an antifreeze protein to a raw material and a gelling agent.
Figure 10:
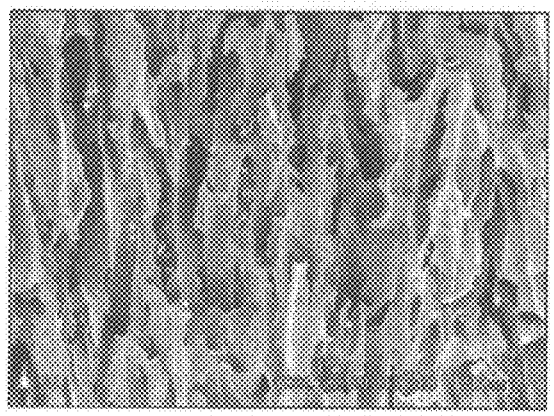

SEM photographs of the porous material made in this Example are shown in FIG. 10. FIG. 10 (A) and FIG. 10 (B) show microstructures of portions near a refrigerant and 0.9 mm distant from the refrigerant, respectively.

Example 6

A slurry was made by mixing 10% by volume of phenol powder (BRP8552 from Showa Highpolymer Co., Ltd., average particle diameter: 5 μm), 86.75% by volume of distilled water, and 0.25% by volume of the antifreeze protein, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was heat-treated at up to 140° C. for 30 minutes.

Figure 11:
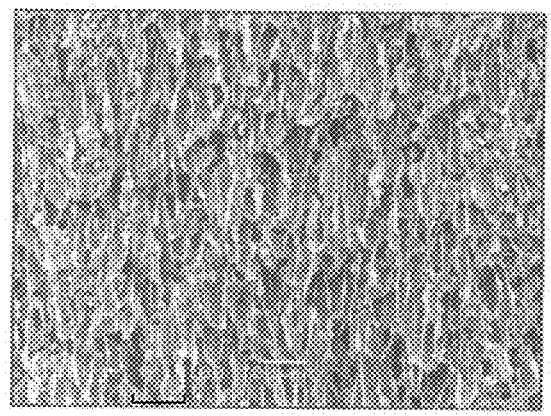
FIG. 11 is a pair of SEM photographs of a porous phenol in the direction parallel to the direction of freezing, which was produced by applying a freezing temperature of −40° C. by a gelation-freezing method after adding 0.25% by volume of an antifreeze protein to a raw material and a gelling agent.
Figure 11:
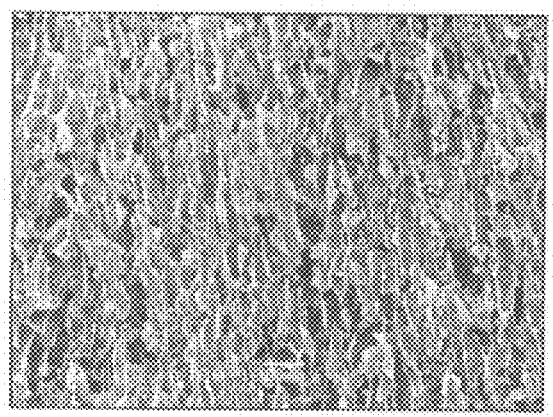

SEM photographs of the phenol resin porous material made in this Example are shown in FIG. 11. FIG. 11 (A) and FIG. 11 (B) show microstructures of portions near a refrigerant and 0.9 mm distant from the refrigerant, respectively.

Comparative Example 1

A slurry was made by mixing 10% by volume of α-alumina powder (TM-DAR from Taimei Chemicals Co., Ltd., average particle diameter: 0.2 μm) and 87% by volume of distilled water, and 3% by volume of gelatin powder (from Wako Pure Chemical Industries Ltd.) was added to the slurry to prepare a slurry.

The slurry was mixed for 1 minute using a planetary-type mixer (ARE-310 from Thinky), cast into a die, and the die was cooled together with its content at −20° C. or −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 2:
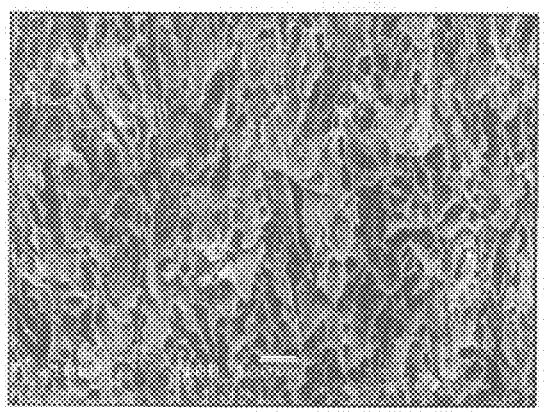
FIG. 2 is a pair of photographs of scanning electron-microscopy (SEM) of a porous alumina in the direction parallel to the direction of freezing, which was produced by applying a freezing temperature of −40° C. by a gelation-freezing method. The sample height is 1 cm.
Figure 2:
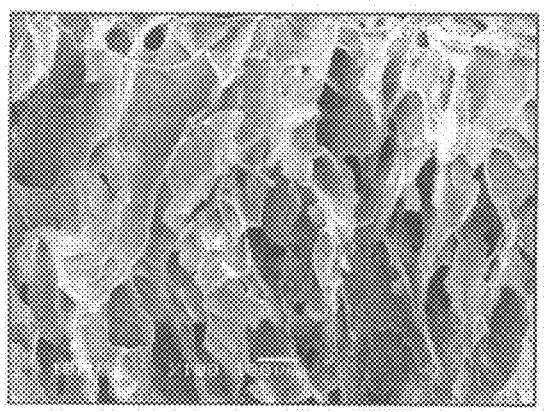
Figure 3:
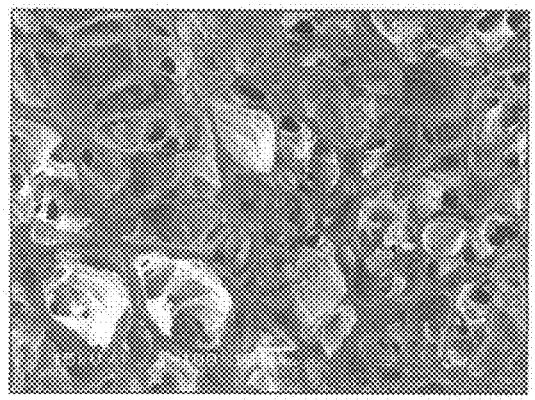
FIG. 3 is a pair of SEM photographs of a porous alumina in the direction vertical to the direction of freezing, which was produced by a gelation-freezing method.
Figure 3:
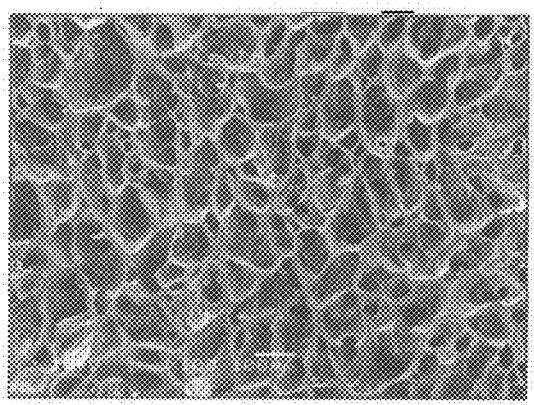

SEM photographs of the cross-section structure of the porous material (−40° C.) made in this Comparative Example, in the direction parallel to the direction of freezing are shown in FIG. 2. The sample height was 1 cm, and FIG. 2 (A) and FIG. 2 (B) show microstructures of portions near a refrigerant and 0.9 mm distant from the refrigerant, respectively. SEM photographs (FIG. 3 (A) (frozen at −20° C.), FIG. 3 (B) (frozen at −40° C.)) of the cross-section structures in the direction vertical to the direction of freezing are shown in FIG. 3. These were each given through observing the central portion obtained by grinding 4 mm each of the upper and lower parts of the sample having a height of 1 cm.

Comparative Example 2

A slurry was made by mixing 30% by volume of α-alumina powder (TM-DAR from Taimei Chemicals Co., Ltd., average particle diameter: 0.2 μm), 67% by volume of distilled water, and 3% by volume of a binder (AP2 from Yuken Industry Co., Ltd.).

The slurry was mixed for 1 minute using a planetary-type mixer (ARE-310 from Thinky), cast into a die, and gelated in a refrigerator. After gelation, the die was cooled together with its content at −40° C. for 1 hour in a freezing tank (Model TRL-080II-LM from Thomas Kagaku Co., Ltd.).

The frozen material was taken off the die and dried for 12 hours in a freeze dry apparatus (FDU-2100 freeze drier from Tokyo Rikakikai Co., Ltd.). Then, it was calcined at 1,200° C. for 2 hours in a calcining furnace.

Figure 4:
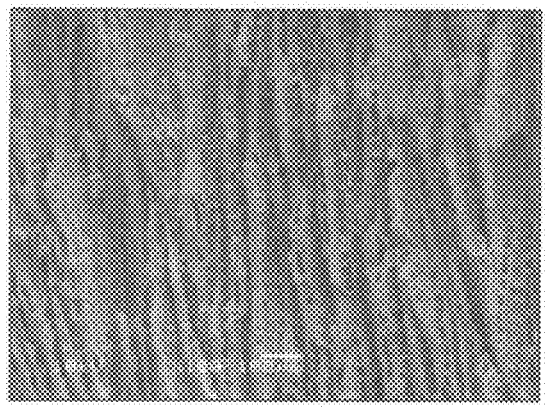
FIG. 4 is a pair of SEM photographs of a porous alumina in the direction parallel to the direction of freezing, which was produced by applying a freezing temperature of −40° C. by a slurry freezing method. The sample height is 1 cm.
Figure 4:
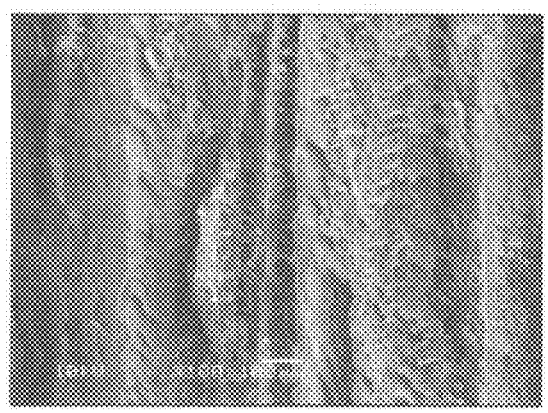

SEM photographs of the cross-section structure of the porous material made (−40° C.), in the direction parallel to the direction of freezing are shown in FIG. 4. FIG. 4 (A) and FIG. 4 (B) show microstructures of portions near a refrigerant and 0.9 mm distant from the refrigerant, respectively.

<Evaluation Result>

(1) Porosity

The open porosities of the heat-treated materials made are collectively shown in Table 1. The open porosity was calculated by Archimedes' method. The value of the total porosity calculated by calculating the bulk density from the dimension and weight of the heat-treated material and subtracting a value provided by dividing it by the true density from 1 was in good agreement with the open porosity calculated by Archimedes' method. All of the samples had closed porosities of 1% or less. The closed pore means a pore not communicating with any pore, and the closed porosity is calculated from the equation:

Total Porosity=(Open Porosity)+(Closed Porosity).

TABLE 1

| Example | Raw Material Content (% by Volume) | Antifreeze Protein Content (% by Volume) | Open Porosity (%) |
|---|---|---|---|
| 1 | 10 | 0.25 | 88 |
| 2 | 10 | 0.50 | 87 |
| 3 | 10 | 3.00 | 88 |
| 4 | 30 | 0.25 | 68 |
| 5 | 10 | 0.25 | 75 |
| 6 | 10 | 0.25 | 87 |

As described in JP Patent Publication (Kokai) No. 2008-201636 A, the porous materials obtained by the gelation-freezing method (Examples 1, 2, 3, 5, and 6) can be high porosity compared to that by the slurry-freezing method (Example 4). The sample calcined at a high-temperature for the purpose of securing strength (Example 5) was reduced in porosity due to calcining shrinkage. As described above, the porosity depended on the raw material content and the calcining temperature irrespective of the content of AFP added.

(2) Tissue/Structure

As shown in FIGS. 2 and 4, when a porous material was made through freezing, drying, and calcining by the conventional method of Comparative Example 1 or 2, the size of pore diameters was non-uniform in the direction parallel to the direction of freezing. Ice crystals were fine when formed at low temperature but coarse when formed at high temperature. The greater distance from a refrigerant in a member, the coarser the resultant tissue becomes in the pore diameter, meaning that the gradient of temperature at freezing between portions around the refrigerant and distant from the refrigerant was remarkable.

As shown in FIG. 3 for Comparative Example 1, non-uniform pore diameter distributions were also observed in cross sections in the direction vertical to the direction of freezing for the conventional method. This indicates that portions having locally high or low temperatures were present due to latent heat release during the formation of ice crystals, producing the difference in the size of the ice crystals. In contrast, the pore diameter distributions in the tissue photographs of FIG. 6 of the porous materials obtained by the present invention in Example 1 were very uniform.

As shown in FIGS. 7 to 11, for the members each containing the antifreeze protein found in the present invention and subjected to freezing, the unevenness of the size of the pore diameter was reduced in the direction parallel to the direction of freezing and the tissue was very uniform. This supports that ice crystals grow in a uniform size and that coalesce and growth in the direction of the axis a are suppressed. The effect of the introduction of an antifreeze protein was confirmed irrespective of the type of a ceramic material or a resin as a raw material.

INDUSTRIAL APPLICABILITY

As described above, the present invention relates to a method for producing a porous material using a freezing method, and the resulting porous material has a uniform size distribution of ice crystals during freezing which could not be conventionally achieved.

According to the present invention, a method for producing a porous material having desired characteristics can be provided without using advanced producing techniques or large and expensive equipment.

The present invention can be applied to various raw materials and is expected to be widely applied to versatile uses such as a filter, an adsorbent, a deodorizing material, a reactor, a diffuser, a shock absorber, a member for processing, a lighter weight material, a solid catalyst, a thermal insulator, and a biomaterial.

All publications, patents, and patent applications cited in this specification are intended to be incorporated herein by reference in their entirety.

The invention claimed is:

1. A method for producing a porous material in which ice crystals are a pore source for the porous material, comprising the steps of: freezing a mixture of water and a raw material comprising at least any one of a ceramic material, a resin, a metal, and precursors of ceramic material from a specific portion of the mixture to produce ice crystals; removing the ice crystals from the frozen material; and heat-treating a dry material obtained in the step of removing the ice crystals from the frozen material, wherein the mixture of a raw material and water or the frozen material comprises an antifreeze protein.

2. The method for producing a porous material according to claim 1, wherein the antifreeze protein is a substance having a function inhibiting the crystal growth and re-crystallization of ice.

3. The method for producing a porous material according to claim 1, wherein the mixture of a raw material and water further comprises at least one gelable water-soluble polymer, wherein said at least one gelable water-soluble polymer is an irreversible gelation polymer capable of being gelated and not returning to a tissue thereof before freezing during drying, and wherein said at least one gelable water-soluble polymer is selected from the group consisting of an acrylamide polymer, an alginic acid polymer, a polyethylenimine polymer, a methylcellulose polymer, a polysaccharide gel, a protein gel, gelatin, and agar.

4. The method for producing a porous material according to claim 1, wherein the raw material is at least any one of silicon carbide, silicon nitride, alumina, zirconia, hydroxyapatite, phenol, acrylic, polystyrene, nylon, polyethylene, polypropylene, polyvinyl chloride, Teflon (registered trademark), iron, and aluminum.

* * * * *